(12) United States Patent
Chiang et al.

(10) Patent No.: US 7,375,788 B2
(45) Date of Patent: May 20, 2008

(54) LIQUID CRYSTAL DISPLAY DEVICE WITH HOLLOW SEMI-COLUMNAR PHOTO SPACERS

(75) Inventors: Ching-Wei Chiang, Miao-Li (TW); Yen-Chung Chang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 382 days.

(21) Appl. No.: 11/120,424

(22) Filed: May 2, 2005

(65) Prior Publication Data
US 2005/0243261 A1    Nov. 3, 2005

(30) Foreign Application Priority Data
Apr. 30, 2004    (TW) ............................... 93112185 A

(51) Int. Cl.
*G02F 1/1339*    (2006.01)
(52) U.S. Cl. .................... 349/155; 349/156; 349/157
(58) Field of Classification Search ........ 349/155–157, 349/153
See application file for complete search history.

(56) References Cited

U.S. PATENT DOCUMENTS

| | | | |
|---|---|---|---|
| 6,163,357 A * | 12/2000 | Nakamura | 349/155 |
| 6,724,458 B2 * | 4/2004 | Kim et al. | 349/156 |
| 6,819,391 B2 * | 11/2004 | Kim et al. | 349/157 |
| 6,864,946 B2 * | 3/2005 | Kim | 349/156 |
| 2002/0113936 A1 * | 8/2002 | Yanagawa et al. | 349/155 |
| 2003/0025868 A1 * | 2/2003 | Hiroshima et al. | 349/156 |
| 2003/0076471 A1 * | 4/2003 | Yanagawa et al. | 349/155 |
| 2005/0099577 A1 * | 5/2005 | Lee et al. | 349/155 |
| 2006/0103803 A1 * | 5/2006 | Jeon et al. | 349/155 |

* cited by examiner

*Primary Examiner*—Andrew Schechter
*Assistant Examiner*—Jessica M Merlin
(74) *Attorney, Agent, or Firm*—Wei Te Chung

(57) ABSTRACT

An LCD device (10) includes a liquid crystal layer (17) interposed between the first (11) and second (19) substrates, a sealant (18) disposed at a peripheral region of the LCD between the first and second substrates for sealing a space between the first and second substrates, and a color filter layer (123) at the first substrate opposite to the second substrate. Furthermore, a photo spacer pattern (15) including a plurality of photo spacers being provided at the color filter layer. The photo spacers are provided within the space and outside the sealant at peripheral portions of the first and second substrates. A distributive density of photo spacers (152) within the space near an interior side of the sealant is larger than a distributive density of photo spacers (153) within the space distal from the interior side of the sealant.

8 Claims, 4 Drawing Sheets

LIQUID CRYSTAL DISPLAY DEVICE WITH HOLLOW SEMI-COLUMNAR PHOTO SPACERS

BACKGROUND OF THE INVENTION

1. Field of the Invention

The present invention relates to liquid crystal display (LCD) devices, and more particularly to an LCD device having photo spacers between substrates thereof.

2. Description of the Related Art

An LCD device has the advantages of portability, low power consumption, and low radiation, and has been widely used in various portable information products such as notebooks, personal digital assistants (PDAs), video cameras and the like. Furthermore, the LCD device is considered by many to have the potential to completely replace CRT (cathode ray tube) monitors and televisions.

In a TFT-LCD (thin film transistor liquid crystal display) device, spacers are provided between two substrates of the device to maintain a cell gap between the substrates. The spacers may be plastic beads, glass beads, or glass fibers. Generally, the spacers are distributed onto one of the substrates during manufacturing of the device. The method of distribution may, for example, be spraying. The spacers are used to keep the cell gap consistent, so as to ensure that the device performs accurately and reliably. However, many or most of the spacers are deposited in a display region of the device. These spacers cause light scattering, which is liable to generate white point defects. Thus, the contrast and the display performance of the device are impaired. For this reason, photo spacers formed by a photolithographic process have been developed to replace conventional plastic beads, glass beads, or glass fibers. Dimensions and positions of the photo spacers are configured to avoid affecting the transmission of light, while at the same time ensuring a uniform cell gap. Thus, the display performance of the device is enhanced.

Referring to FIG. 7, this is a simplified, schematic, side cross-sectional view of a conventional LCD device having photo spacers. In the process of making the LCD device 70, firstly, a color pixel layer 174 and a black matrix layer 175 are provided on a color filter substrate 171. A continuous photo spacer 176 is formed on a peripheral region of the color filter substrate 171. The photo spacer 176 is located at an outside of the black matrix 175 and the color pixel layer 174, and is spaced a predetermined distance from the black matrix layer 175. Secondly, a sealant 177 is formed on a TFT substrate 179. The sealant 177 is located opposite to an outside of the photo spacer 176. Drops of liquid crystal 178 are dispensed onto the TFT substrate 179 one by one. Then the color filter substrate 171 is pressed face-to-face onto the TFT substrate 179 under vacuum, and the sealant 177 is cured by applying ultraviolet light thereto. The color filter substrate 171 and the TFT substrate 179 are thus engaged together to form the LCD device 70.

The black matrix and the color pixel layers 175, 174 are separated from the sealant 177 by the photo spacer 176. When ultraviolet light is applied from a top side of the color filter substrate 171 to cure the sealant 177, the black matrix layer 175 does not interfere with the irradiation of the sealant 177. In other words, there are no light shielding problems, and the sealant 177 can be completely cured. Moreover, during the curing process, the sealant 177 does not contact the liquid crystal 178, so the liquid crystal 178 cannot be soiled or damaged.

However, the photo spacer 176 is only formed at the peripheral region of the LCD device 70. Portions of the substrates 171, 179 at the black matrix and color pixel layers 175, 174, and at peripheral regions outside the sealant 177, are not directly supported by the photo spacer 176. Therefore, the distance between the substrates 171, 179 may not be uniform. That is, the LCD device 70 may not have a consistent cell gap, which can impair the display characteristics of the LCD device 70.

It is desired to provide an improved LCD device which overcomes the above-described deficiencies.

SUMMARY OF THE INVENTION

An LCD device in accordance with one preferred embodiment of the present invention includes a first substrate, a second substrate opposite to the first substrate, a liquid crystal layer interposed between the first and second substrates, a sealant disposed at a peripheral region of the liquid crystal display device between the first and second substrates for sealing a space between the first and second substrates, and a color filter layer at the first substrate opposite to the second substrate. Furthermore, a photo spacer pattern including a plurality of photo spacers being provided at the color filter layer. The photo spacers are provided within the space and outside the sealant at peripheral portions of the first and second substrates. A distributive density of photo spacers within the space near an interior side of the sealant is larger than a distributive density of photo spacers within the space distal from the interior side of the sealant.

The photo spacers are formed not only within the space but also outside the sealant at a peripheral portion between the substrates. This configuration ensures that the LCD device has a consistent cell gap, and can therefore provide a steady, reliable display.

Other objects, advantages and novel features of the invention will become more apparent from the following detailed description when taken in conjunction with the accompanying drawings, in which:

DETAILED DESCRIPTION OF THE PRESENT INVENTION

Reference will now be made to the drawings to describe the present invention in detail.

Figure 1:
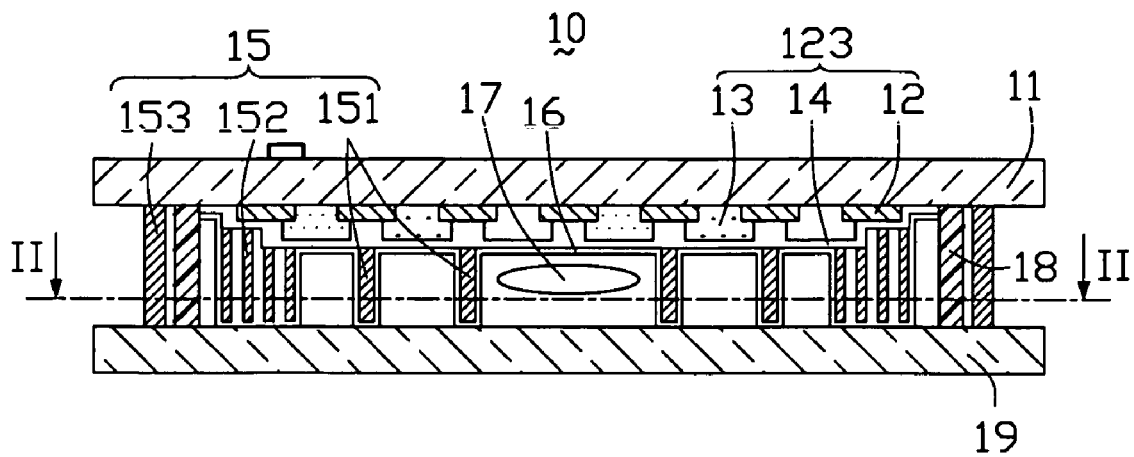
FIG. 1 is a simplified, schematic, side cross-sectional view of an LCD device according to a first embodiment of the present invention.
Figure 2:
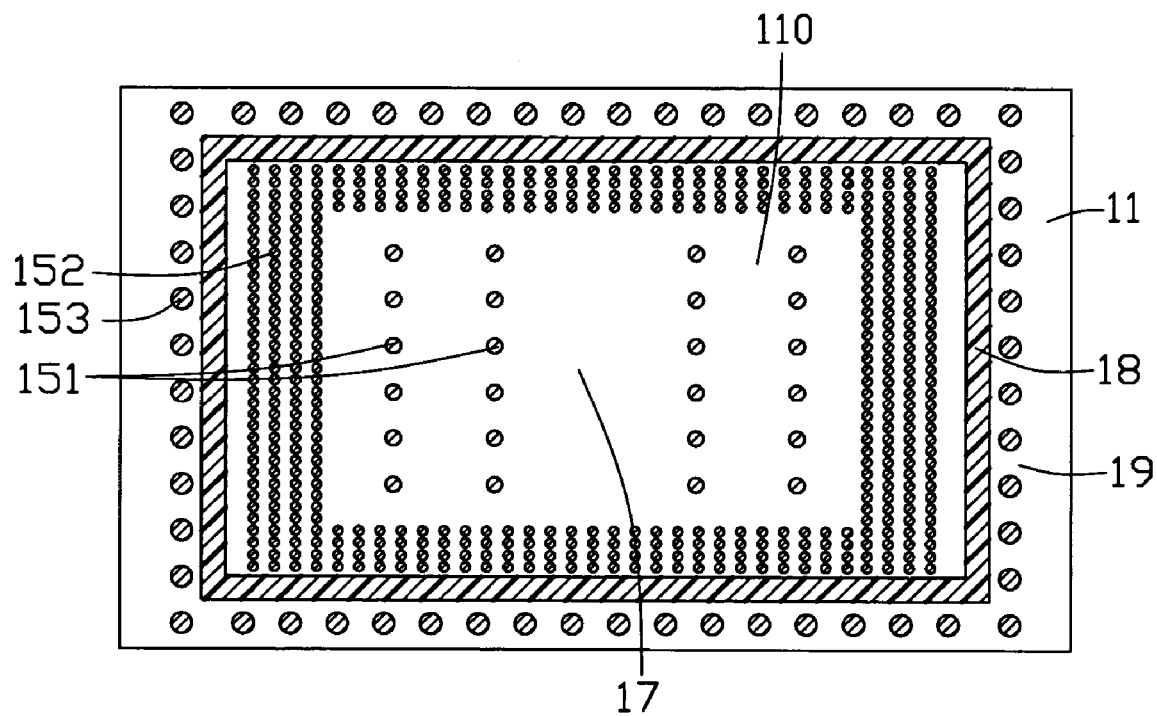
FIG. 2 is a cross-sectional view of the LCD device of FIG. 1, corresponding to line II-II thereof.

FIG. 1 is a schematic, side cross-sectional view of an LCD device according to the first embodiment of the present invention. The LCD device 10 includes a transparent first substrate 11, a transparent second substrate 19 opposite to the first substrate 11, and a layer of liquid crystal molecules 17 sandwiched between the substrates 11, 19. Referring also to FIG. 2, a sealant 18 is disposed at a peripheral region of the substrates 11, 19 to engage the substrates 11, 19 together and seal a space 110 therebetween. A photo spacer pattern 15 is disposed between the substrates 11, 19, for supporting the substrates 11, 19 and maintaining the space 110 as between the substrates 11, 19.

The second substrate 19 comprises a plurality of electrodes (not labeled), which are used for generating an electric field to drive the liquid crystal molecules 17.

The first substrate 11 has a color filter layer 123, which includes a black matrix 12, a color layer 13, and a transparent conductive layer 14. The black matrix 12 defines a plurality of recesses, and the color layer 13 has a plurality of red (R), green (G), blue (B) color resists filling in the recesses. The transparent conductive layer 14 covers the color layer 13 and the black matrix 12. The sealant is disposed at an exterior margin of the black matrix 12.

The photo spacer pattern 15 comprises three groups of photo spacers, the photo spacers in the groups being designated 151, 152, 153 respectively. The photo spacers 151 are discontinuously disposed on the transparent conductive layer 14 in a main central part of the space 110. The photo spacers 152 are discontinuously deposited on the transparent conductive layer 14 in a peripheral part of the space 110. The photo spacers 153 are discontinuously disposed outside the sealant 18 between the peripheral regions of the substrates 11, 19. The photo spacers 151 are formed as a plurality of discrete columnar protrusions. The photo spacers 151 are disposed in a central display area of the LCD device 10 in positions corresponding to the black matrix 12. The photo spacers 152 are formed as a plurality of discrete columnar protrusions. The photo spacers 152 are disposed in an array adjacent and substantially parallel to the sealant 18, and are separated a distance from the sealant 18. A distributive density of the photo spacers 152 is larger than a distributive density of the photo spacers 151. The photo spacers 153 are formed as a plurality of discrete columnar protrusions. The photo spacers 153 are arranged around the sealant 18 at substantially regular intervals, and are spaced a same distance from the sealant 18.

The photo spacers 151, 152, 153 are made of a negative acrylic resin, and are formed by a photolithographic process. All the photo spacers 151, 152, 153 have lower surfaces for adhering to the second substrate 19, and all the lower surfaces are coplanar.

The photo spacers 151, 152, 153 are disposed between and distributed across substantially an entire inner surface area of each of the substrates 11, 19. This configuration ensures that the LCD device 10 has a consistent cell gap at the central display area and at a peripheral portion outside the sealant 18.

In an alternative embodiment of the LCD device 10, the black matrix 12 is omitted. The color layer 23 comprises a plurality of color resists of red (R), green (G), and blue (B) separately and alternately formed on a surface of the substrate 11. The photo spacers 151 are a plurality of individual protrusions corresponding to gaps between adjacent color resists. A width of the photo spacers 151 is larger than a width of the gaps between the adjacent color resists. The photo spacers 151 are made of an acrylic resin which has a high optical density similar to that of a black matrix. That is, even though the black matrix is omitted, the photo spacers 151 can shield light.

Figure 3:
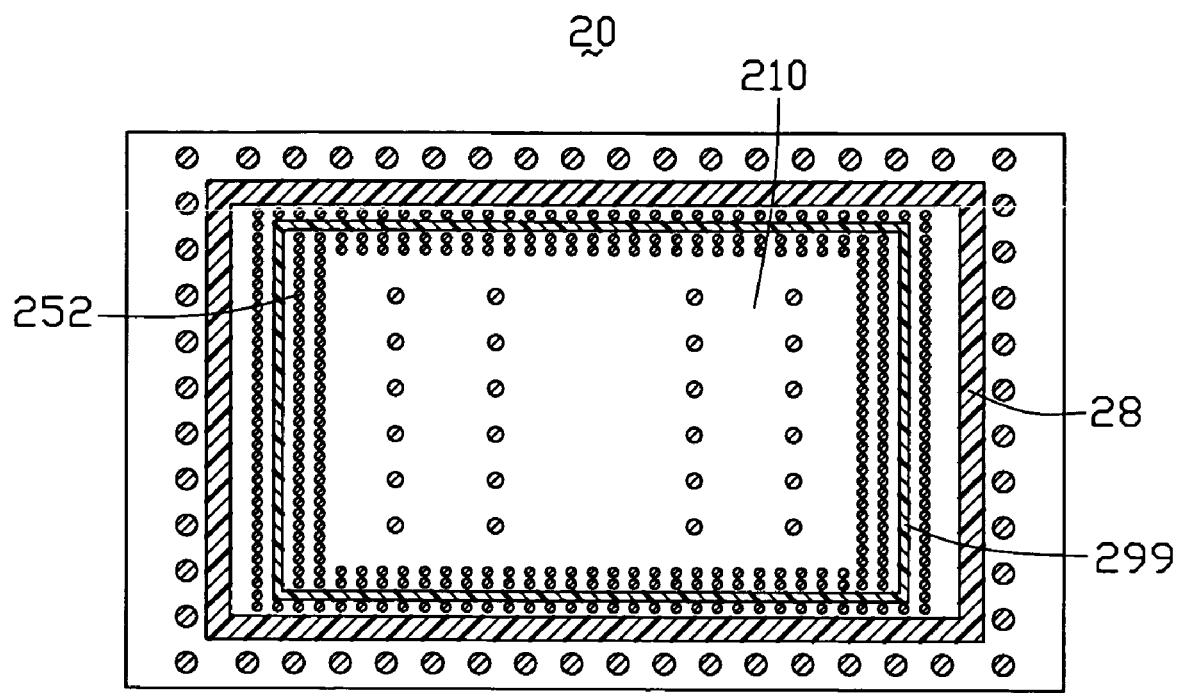
FIG. 3 is a schematic, top cross-sectional view of a substrate and associated parts employed in an LCD device according to a second embodiment of the present invention.

FIG. 3 is a schematic, top cross-sectional view of a substrate and associated parts employed in an LCD device according to the second embodiment of the present invention. The LCD device 20 has a configuration similar to the LCD device 10 of the first embodiment. The difference is that the LCD device 20 further includes a continuous photo spacer 299 surrounded on all sides by photo spacers 252. The photo spacer 299 and the photo spacers 252 are all located within a space 210 defined between the substrate and a sealant 28, with the photo spacer 299 being substantially parallel to the sealant 28. Because the photo spacer 299 is continuous, a distributive density of the photo spacer 299 is larger than a distributive density of the photo spacers 252. This configuration of the LCD device 20 can help prevent an interior of the LCD device 20 being soiled or damaged. The LCD device 20 also includes photo spacers 251.

Figure 4:
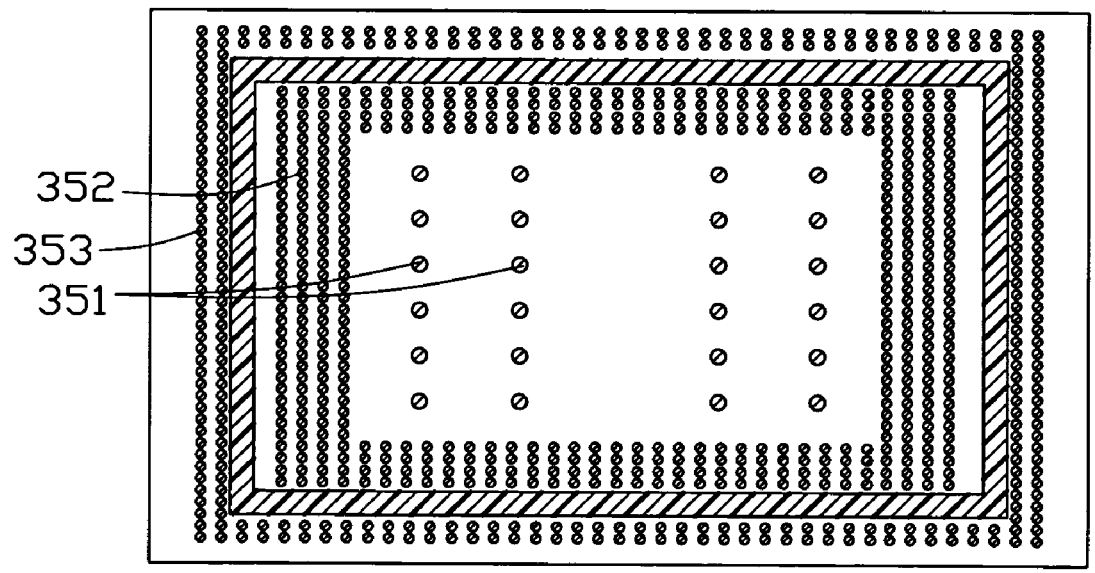
FIG. 4 is a schematic, top cross-sectional view of a substrate and associated parts employed in an LCD device according to a third embodiment of the present invention.

FIG. 4 is a schematic, top cross-sectional view of a substrate and associated parts employed in an LCD device according to the third embodiment of the present invention. The LCD device 30 has a configuration similar to the LCD device 10 of the first embodiment. The difference is that a distributive density of photo spacers 353 is approximately the same as a distributive density of photo spacers 352, both these distributive densities being larger than a distributive density of photo spacers 351.

Figure 5:
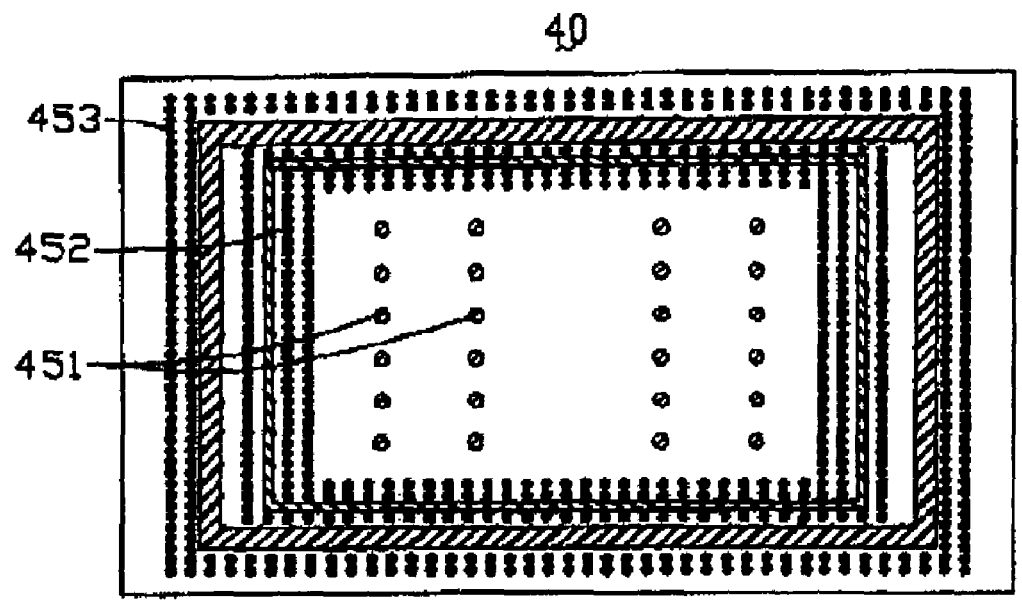
FIG. 5 is a schematic, top cross-sectional view of a substrate and associated parts employed in an LCD device according to a fourth embodiment of the present invention.

FIG. 5 is a schematic, top cross-sectional view of a substrate and associated parts employed in an LCD device according to the fourth embodiment of the present invention. The LCD device 40 has a configuration similar to the LCD device 20 of the second embodiment. The difference is that a distributive density of photo spacers 453 is approximately the same as a distributive density of photo spacers 452, both these distributive densities being larger than a distributive density of photo spacers 451.

Figure 6:
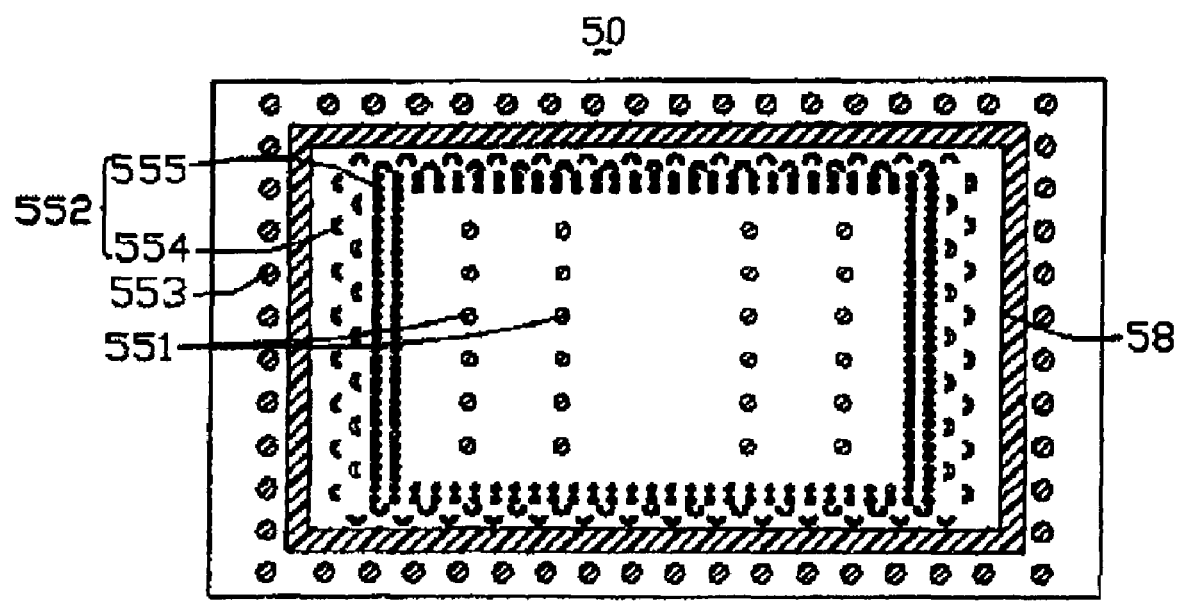
FIG. 6 is a schematic, top cross-sectional view of a substrate and associated parts employed in an LCD device according to a fifth embodiment of the present invention.
Figure 7:
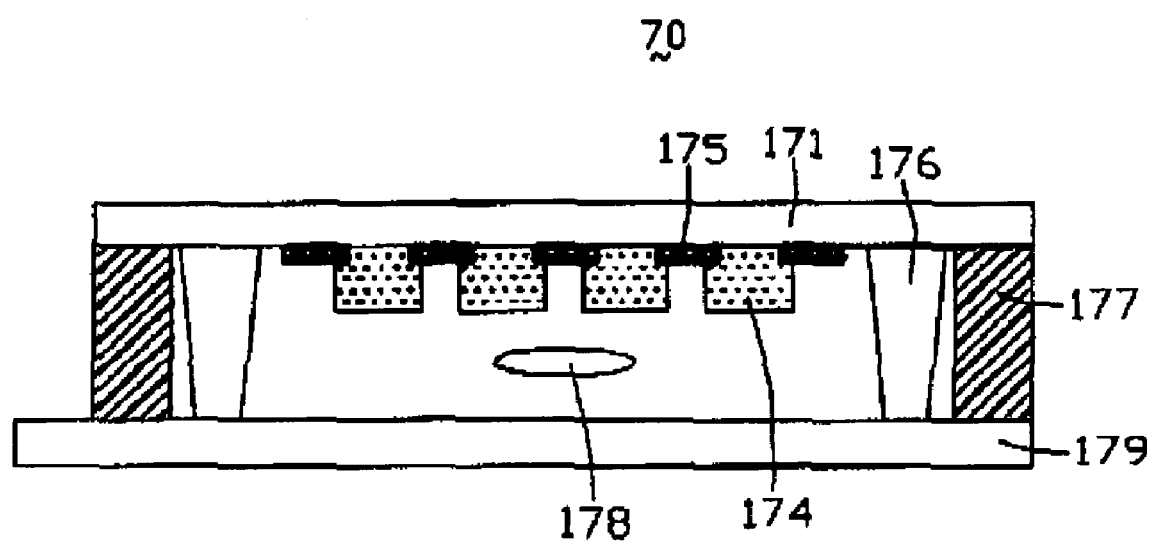
FIG. 7 is a simplified, schematic, side cross-sectional view of a conventional LCD device.

FIG. 6 is a schematic, top cross-sectional view of a substrate and associated parts employed in an LCD device according to the fifth embodiment of the present invention. The LCD device 50 has a configuration similar to the LCD device 10 of the first embodiment. The difference is that photo spacers 552 include two types of photo spacers 554, 555. The photo spacers 554 have a hollow semi-columnar configuration. The photo spacers 554 are disposed adjacent and substantially parallel to a sealant 58. The photo spacer 555 are columnar, and are disposed adjacent the photo spacers 554 and substantially parallel to the sealant 58. The LCD device 50 also comprises photo spacers 551, 553.

Unlike in a conventional LCD device, the photo spacers according to the present invention are formed not only within the space surrounded by the sealant, but also outside the sealant at peripheral portions of the substrates. This configuration ensures that the LCD device has a consistent cell gap, and can provide a steady, reliable display.

It is to be understood, however, that even though numerous characteristics and advantages of the preferred embodiments and the present invention have been set out in the foregoing description, together with details of the structures and functions of the embodiments and the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display device, comprising:
   a first substrate;
   a second substrate opposite to the first substrate;
   a liquid crystal layer interposed between the first and second substrates;
   a sealant disposed at a peripheral region of the liquid crystal display device between the first and second substrates for sealing a space between the first and second substrates; end
   a color filter layer at the first substrate opposite to the second substrate, a photo spacer pattern including a plurality of photo spacers being provided at the color filter layer, the photo spacers being provided within the space and outside the sealant at peripheral portions of the first and second substrates, wherein a distributive density of photo spacers within the space near an interior side of the sealant is larger than a distributive density of photo spacers within the space distal from the interior side of the sealant;
   wherein at least some of the photo spacers within the space have a hollow semi-columnar configuration.

2. The liquid crystal display device as claimed in claim 1, wherein the photo spacers are made of a negative acrylic resin.

3. The liquid crystal display device as claimed in claim 1, wherein a distributive density of the photo spacers outside the sealant at peripheral portions of the first and second substrates is larger than a distributive density of the photo spacers within the space distal from the interior side of the sealant.

4. The liquid crystal display device as claimed in claim 1, wherein one of the substrates comprises a black matrix, and photo spacers within the space are disposed corresponding to the black matrix.

5. The liquid crystal display device as claimed in claim 4, wherein the sealant is disposed at outside of the black matrix.

6. The liquid crystal display device as claimed in claim 4, wherein the sealant is disposed at an exterior margin of the black matrix.

7. The liquid crystal display device as claimed in claim 1, wherein the color filter layer comprises a plurality of color resists of red (R), green (G), and blue (B) separately and alternately formed at the first substrate, and photo spacers within the space are disposed corresponding to gaps between adjacent color resists.

8. The liquid crystal display device as claimed in claim 1, wherein the photo spacer pattern further includes a discontinuous photo spacer disposed within the space parallel to and separate from the sealant.

* * * * *